(No Model.)
C. R. BRIDGES.
REGULATOR FOR INCUBATORS.
No. 583,592. Patented June 1, 1897.
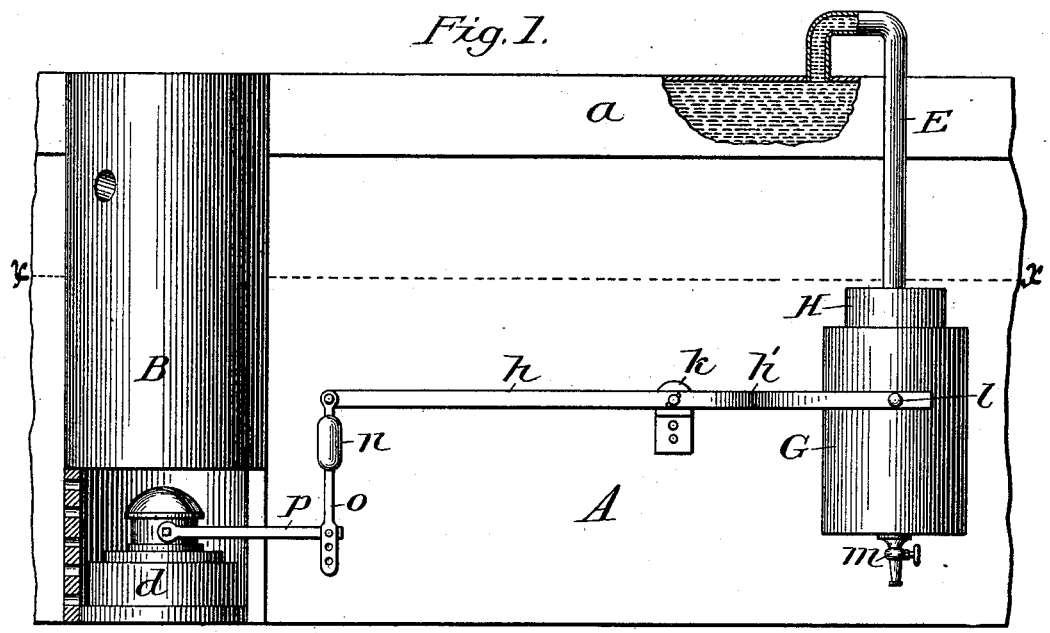
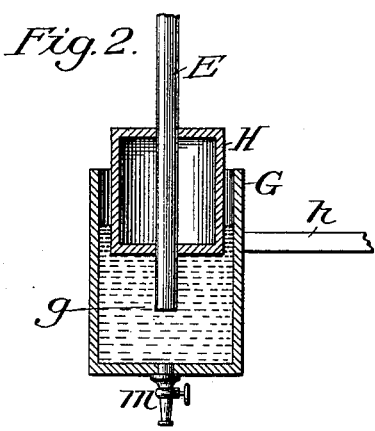
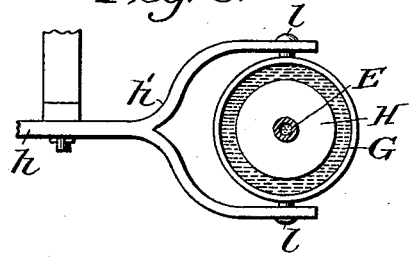
Witnesses.
William Tile Lockney
F. W. Stevens.
Inventor.
Clifton R. Bridges.
by Bowdoin S. Parker
his attorney.

UNITED STATES PATENT OFFICE.

CLIFTON R. BRIDGES, OF NEW SALEM, MASSACHUSETTS.

REGULATOR FOR INCUBATORS.

SPECIFICATION forming part of Letters Patent No. 583,592, dated June 1, 1897.

Application filed November 16, 1893. Serial No. 491,165. (No model.)

*To all whom it may concern:*

Be it known that I, CLIFTON R. BRIDGES, of New Salem, in the county of Franklin and State of Massachusetts, have invented a certain new and useful Improvement in Regulators for Incubators, &c., of which the following, taken in connection with the accompanying drawings, is a specification.

My present invention relates to regulating devices designed to operate automatically.

In the drawings like letters of reference indicate corresponding parts.

Figure 1 is an elevation of my regulating device as connected with the body of an incubator and arranged to operate the lamp burner and wick of a heater. Fig. 2 is a sectional elevation of the cup and float portion of my present device. Fig. 3 is a sectional view of cup and lever on the line $x\ x$, Fig. 1.

My regulating device as herein set forth is designed especially for use in connection with my incubator for artificially hatching eggs and which is shown and described in my pending application for a patent upon said incubator, Serial No. 479,442.

In the artificial hatching of eggs it is of prime importance that the temperature within the incubator should be maintained at a given heat, for if the temperature is uneven—either too hot or too cold—the hatching of the eggs is retarded or totally prevented. The more positive, delicate, and reliable the means of controlling the temperature the greater success, other things being equal, in the operation of the incubator.

While my present regulating device is designed especially for incubators, I do not wish to limit myself to its use in this class of articles. It is specially applicable to regulate where the temperature is kept very low—i. e., at less than the boiling-point.

In the drawings, A represents a section of the body of an incubator, the portion represented by $a$ being an air-tight water compartment or tank.

B represents the heater, which is suitably connected with the water-compartment of the body of the incubator.

$d$ is the lamp, by which the water circulating through the heater is warmed.

The regulator proper consists of the pipe E, attached to the body A and communicating interiorly with compartment $a$. This pipe is extended below the water-compartment, to which the upper end of the pipe is attached. Upon the lower end of stationary pipe E is placed an air-tight float H, the pipe E passing through or below the float H, so that its lower end will permit water from the compartment $a$ to flow down into the cup G or to be withdrawn therefrom, as hereinafter explained. The cup G is suspended on arm $h$, said arm being preferably made forked or in two parts from point $h'$, one part upon each side of cup G.

In Fig. 1 the arm $h$ is shown, and one of the forked ends of said arm is shown as supporting the cup G by a pivotal connection $l$. The opposite side of cup G is of course supported by the other fork of the arm $h$. The arm $h$ and fork, with its connection with the cup G, are clearly shown in Fig. 3. Arm $h$ is pivoted or fulcrumed at $k$, and upon the opposite end is the rod $o$, connected with end of arm $h$. The said rod is weighted at $n$ to counterbalance the cup G and its contents and attachments. Rod $o$ is suitably secured to the lever $p$, which regulates the flame in the usual manner. A cock $m$ is placed in the bottom of cup G for convenience in drawing off the water $g$ therein and of adjusting the several parts for operating.

Having now explained the several parts of my device, I will explain its mode of operation.

In my device I make use of the principles of hydrostatics and hydraulics. In the first place the water-compartment $a$ of body A is filled with water, a portion of which will flow over into cup G, or cup G may be filled by water independently. The compartment $a$ is then closed air-tight, the necessary adjustments having been made by drawing off more or less of the water $g$ in cup G or by placing the proper weight $n$ on rod $o$, so that the weight of the cup G and parts on its side of fulcrum $k$ will be less than weighted rod $o$ and parts on the other side of fulcrum $k$. The lamp $d$ being now lighted the water within the compartment $a$ will be warmed, and as the temperature rises the expansion of the water will cause it to overflow by pipe E into cup G. This increase in water in cup G will press upon the stationary float H, attached to end of pipe E. The cup G, being free to move up and down in relation to the fixed float H, supported, as described, upon the forked arm $h$, with its pivotal connections, will be forced downward. This will move the lever $h$ and of course communicate motion to the lever $p$, and the lamp-flame will be decreased correspondingly and the heat lessened. As the water cools it contracts, and the surplus water that flows over into the cup G will be drawn up through pipe E into water-compartment $a$. The withdrawal of this water from cup G of course lightens the weight and also the pressure upon the float, and the weight $n$ will pull the arm $h$ down, increasing the flame and heat. In this way the temperature of the incubator can be automatically controlled to a nicety.

It is essential to the working of this device that the water-compartment to which pipe E is connected and communicates should be sealed air-tight. If, for instance, air was permitted to get into the water-compartment by means of any hole or opening, the water would all flow out, the weight of water being heaviest on the side of cup G than in the bend of the upper end of pipe E. Pipe E is formed substantially as shown in Fig. 1 at its upper end, so that the principle of the siphon will be utilized.

The cup G is hung above its center, so that there will always be greater weight in the cup below its pivotal connection with forked arm $h$ than above. This arrangement preserves an upright position of cup G relatively to the float H automatically, whatever the amount of water in cup G or the position of lever $h$.

As already suggested, it is of much importance in the practical operation of my device that the weight $n$ and connections on its side of fulcrum $k$ be greater than the cup G with its contents and connections on the opposite side of fulcrum $k$. If the two sides were equally balanced, the operation would be similar to a pair of scales, and upon any increase of weight of water in cup G the cup would be pushed down and the light extinguished. If, for instance, the parts on the side toward the lamp are just equal to the parts upon the opposite side, the slightest variation in the weight of the water in cup G would upset the equilibrium of parts and the parts would move to the full limit. Thus there would always be too much blaze of the lamp-wick or none at all.

The device herein is shown in connection with a lamp; but I do not confine myself to its use in this connection, as it can be used in a variety of ways and with other connections and still be within the spirit of my invention.

Having now described my invention, what I desire to secure by Letters Patent of the United States is—

1. The herein-described regulating device, consisting of the pipe E, adapted to be connected with an air-tight water-tank and having a stationary float, H, secured to its lower extremity; the cup G, formed to receive the float H, and adapted to operate in connection therewith; the fulcrumed lever $h$, weighted at one end and supporting the cup G, at the other end, and all combined and adapted to operate substantially as and for the purposes set forth.

2. In a regulating device, the combination of the lever $h$, weighted, fulcrumed and bifurcated to receive and hold the cup G, pivotally secured thereto; the pipe E, and float H, secured thereto; the cup G, and float H, adapted to move in relation to each other by the action of the water in the cup and the action of the weight upon the lever, in pressing the said cup upwardly against the said float, substantially as and for the purposes set forth.

In testimony whereof I have signed my name to this specification, in the presence of two subscribing witnesses, on this 14th day of November, A. D. 1893.

CLIFTON R. BRIDGES.

Witnesses:
 BOWDOIN S. PARKER,
 FRED H. MCMILLAN.